United States Patent [19]

Derrick

[11] Patent Number: 5,386,757
[45] Date of Patent: Feb. 7, 1995

[54] UNIVERSAL MUSICAL SCALE, SCALE PATTERN, AND CHORD INDICATOR

[76] Inventor: Daniel Derrick, 3245 Gavilan La., Las Vegas, Nev. 89122

[21] Appl. No.: 31,950

[22] Filed: Mar. 16, 1993

[51] Int. Cl.⁶ .................................................. G09B 15/02
[52] U.S. Cl. .............................. 84/473; 84/471 SR; 84/485 SR
[58] Field of Search ............ 84/473, 471 SR, 485 SR, 84/471 R

[56] References Cited

U.S. PATENT DOCUMENTS

| | | | |
|---|---|---|---|
| 2,824,479 | 2/1958 | De Rosa | 84/485 SR |
| 3,245,303 | 4/1966 | Patt | 84/485 SR |
| 3,668,967 | 6/1972 | Malis | 84/471 |
| 3,748,947 | 7/1973 | Freiheit | 84/485 SR |
| 3,758,698 | 9/1973 | Matyas | 84/485 SR |
| 3,785,240 | 1/1974 | Hill | 84/485 SR |
| 3,894,465 | 7/1975 | Simmons | 84/485 SR |
| 4,969,383 | 11/1990 | Bezeau | 84/485 SR |
| 5,029,507 | 7/1991 | Bezeau | 84/485 SR |

*Primary Examiner*—Michael L. Gellner
*Assistant Examiner*—Cassandra C. Spyrou

[57] ABSTRACT

A device for demonstrating musical scales and chords in various tonics for use with a fretted stringed musical instrument. A housing is of a slide-rule nature and has a transparent simulated fingerboard positioned within a display window. This fingerboard is reticulated, with an imprinted series of uniformly-spaced parallel string lines extending longitudinally and representing the strings of the instrument. These lines are regularly interrupted by an imprinted series of position alignment indicia and tone letters. A series of uniformly-spaced printed parallel lines transverse the longitudinal lines and represent the nut and frets of the instrument. Additional display windows disclose a plurality of related information; these windows are used primarily to identify certain tonal characteristics. A plurality of displaceable medial sliding members is provided, each having a system of tone indicators printed in a predetermined manner. These indicators are used to identify tonality. A plurality of color-coding systems, also printed in a predetermined manner, consist of an index of finger position indicia. These coding systems are used to isolate a maximum of five scale patterns for every twelve frets of fingerboard travel and also to identify finger placements for chord formations. When a preselected sliding member is inserted into an aperture of the housing, these indicators and coding systems align with their respective display windows and position alignment indicia. Thus, the related tone locations are identified for each tonic selected.

1 Claim, 4 Drawing Sheets

UNIVERSAL MUSICAL SCALE, SCALE PATTERN, AND CHORD INDICATOR

BACKGROUND

1. Field of Invention

This invention relates generally to fretted stringed musical instruments, and more specifically to a device for indicating musical scales and chords for a fretted instrument such as a guitar.

BACKGROUND

2. Discussion of Prior Art

Many previous attempts have been made to simplify the learning of fingering positions and the tonal relationships of musical scales and chords; specifically, their applications to a fretted stringed musical instrument such as the guitar. Many slide rule-type devices have been proposed which show fingering positions for chords, and a few show fingering positions for scales. However, most of these devices either fail to integrate the illustration of both scales and chords or are quite limited in their scope.

U.S. Pat. No. 5,029,507 to Bezeau (Jul. 9, 1991) discloses a chord progression finder for guitar, piano, organ, and alto saxophone. This device consists of a base with printed information pertaining to a plurality of musical instruments, as well as fingering patterns for playing the seven commonly used modes generated by the major "Ionian" scale. An initial slidable overlay having the printed letter designations for musical tones coordinates with the fingering patterns on the base to indicate the finger positions on the particular musical instrument. A second slidable overlay, having printed indicia indicative of chord numbers, is connected to the base in such a manner that it may slide to cooperate with the first overlay, producing specific chord voicings which are then used to form chord progressions.

U.S. Pat. No. 3,748,947 to Freiheit (Jul. 31, 1973) discloses a melody chord constructor for string instruments. This device consists of a base unit having a plurality of printed note symbols, and a member which is relatively slidable with respect to said base unit. This slidable member is imprinted with a plurality of numerical symbols capable of representing the degrees of the major "Ionian" scale and its six related scale modes, including the natural minor mode. The device is used for the construction of melody chords, which are extracted from said scales, or modes.

U.S. Pat. No. 4,969,383 to Bezeau (Nov. 13, 1990) discloses a musical scale indicator for guitar, piano, organ, and alto saxophone. This device consists of a base having printed fingering patterns to indicate the seven modes generated by the major "Ionian" scale and a slidable overlay having the printed letter designations for musical tones. This overlay coordinates with the fingering patterns on the base to indicate the fingering positions on the subject musical instrument.

U.S. Pat. No. 3,668,967 to Malis (Jun. 13, 1972) discloses a chord indicator, designed in the manner of a three-layer slide rule. One layer contains a transparent simulated twenty-one fret fingerboard; the other two layers have a plurality of indicators which are slidable relative to the simulated fingerboard. This causes said indicators to align with one another and with the characters on the fingerboard, thereby identifying various chords and their fingering positions.

U.S. Pat. No. 3,758,698 to Matyas (Sep. 11, 1973) discloses a fingerboard chord slide rule. This device consists of a housing which contains a plurality of internal guideways; each guideway is adapted to receive a displaceable slide, one for each string of the instrument. The device is used to construct chords.

U.S. Pat. No. 3,894,465 to Simmons (Jul. 15, 1975) discloses a chord finder. This device consists of a body portion and two movable simulated twelve fret fingerboards having guides for finger placement thereon, and is used to indicate a few specific chords.

U.S. Pat. No. 3,785,240 to Hill (Jan. 15, 1974) discloses a chord teaching device. It consists of an elongate box having a simulated fifteen-fret fingerboard and a supporting wall behind said fingerboard. This creates a slot for the insertion of any one of a plurality of chord cards which have fingering indicators thereon. The device is used to demonstrate the finger positions of various chords.

U.S. Pat. No. 3,245,303 to Patt (Apr. 12, 1966) discloses a device for teaching finger positions for fretted stringed instruments. The device has a series of pages, each having a plurality of dots thereon, and an overlay having a simulated fingerboard. This overlay is placed atop the pages to indicate the fingering positions of the notes used to form a variety of chord types.

Most of the references cited above relate to the demonstration of chords alone rather than to the integration of musical scales and chords into a single device. Those references which do demonstrate musical scales and chords do so by showing chords which are extracted from a limited number of related scale modes, or inversions, generated by a single musical scale type. They do not demonstrate a wide variety of scale types in various pattern voicings, nor are they intended to do so. Further, the tonal relationships within musical scales have not, thus far, been sufficiently addressed by these devices; while an operator may know where his or her fingers are to be placed for sounding the individual tones of a musical scale, he or she is unaware of what is implied harmonically.

Accordingly, what is needed is an indicator that will not only demonstrate the fingering positions for a variety of musical scales and chords, but will also identify the individual tones within musical scales with respect to scale degree terminology.

OBJECTS AND ADVANTAGES

As well as the objects and advantages of the present invention described in my application, several objects and advantages are:

- to provide a hand-held, music-related slide rule which can be used as a supplementary learning method for use with fretted stringed musical instruments;
- to provide a music-related slide rule which can be used as an aid in learning basic concepts for improvisation;
- to provide a music-related slide rule which can be used in calculating certain harmonic relationships for the purpose of music composition;
- to provide a music-related slide rule which can be used to demonstrate an exhaustive variety of musical scale types in various tonics;
- to provide a music-related slide rule which can be used to demonstrate an exhaustive variety of chords and chord extractions;

to provide a music-related slide rule which can be used to demonstrate an exhaustive variety of licks and arpeggios;

to provide a music-related slide rule which can be used to demonstrate the actual fingering positions for a multiplicity of caged scale patterns and chords in various voicings as they relate to the fingerboard of the subject fretted instrument;

to provide a music-related slide rule which can be used in demonstrating the tonal relationships of musical scales over the major, minor, and dominant chord families;

to provide a music-related slide rule which can be used in demonstrating both consonant and dissonant relationships of scales to chords.

Further objects and advantages are: to provide a music-related slide rule which is small in size, light in weight, user-centered, and inexpensive to manufacture. Still further objects and advantages will become apparent from a consideration of the ensuing descriptions and drawings.

| Drawing Reference Numerals | |
| --- | --- |
| 10 housing | 12 simulated fingerboard |
| 14 frets | 16 string lines |
| 18 position alignment indicia | 20 tone letters |
| 22 nut | 24 fret number indicators |
| 26 string number indicators | 27 display window |
| 28 display window | 30 display window |
| 32 display window | 34 display window |
| 36 display window | 38 display window |
| 40 display window | 42 display window |
| 44 triad indicator | 46 position markers |
| 50 sliding member | 52 tone indicators |

| -continued | |
| --- | --- |
| Drawing Reference Numerals | |
| 54 tone indicators | 56 tone indicators |
| 58 tone indicators | 60 tone indicators |
| 62 tone indicators | 64 tone indicators |
| 66 tone indicators | 68 finger position indicia |
| 70 scale patterns | 82 finger placement indicator |
| 84 finger placement indicator | 86 finger placement indicator |
| 88 finger placement indicator | 90 aperture |

SUMMARY

A hand-held, music-related, slide rule-type device capable of demonstrating a wide variety of musical scales, from the more common modes generated by the major "Ionian" scale to exotic scales such as "Hindu" and the foreign "Spanish 8-Tone". Pentatonic scales, also indicated, figure prominently in numerous diverse musical stylings such as rock, blues, country, and jazz; as well as in the music of many cultures, including Latin-American, Chinese, Polynesian, African, Celtic, and Native American. Furthermore, this device is capable of indicating a wide variety of chord types in various voicings, including three-note chords, or "triads". With the application of this device, triads are easily extracted from any musical scale type containing a first, third, and fifth harmonic interval. This chord extraction constitutes the harmonic basis of tonal music, making this device useful in the composition of music, as an aid in the mastery of basic concepts considered critical for improvisation, or simply as a supplementary learning method to any other methods. Finally, these outlined objectives may be accomplished without a prior knowledge of traditional staff notation.

DETAILED DESCRIPTIONS OF THE DRAWINGS—FIGS. 1 TO 5

Figure 1A:
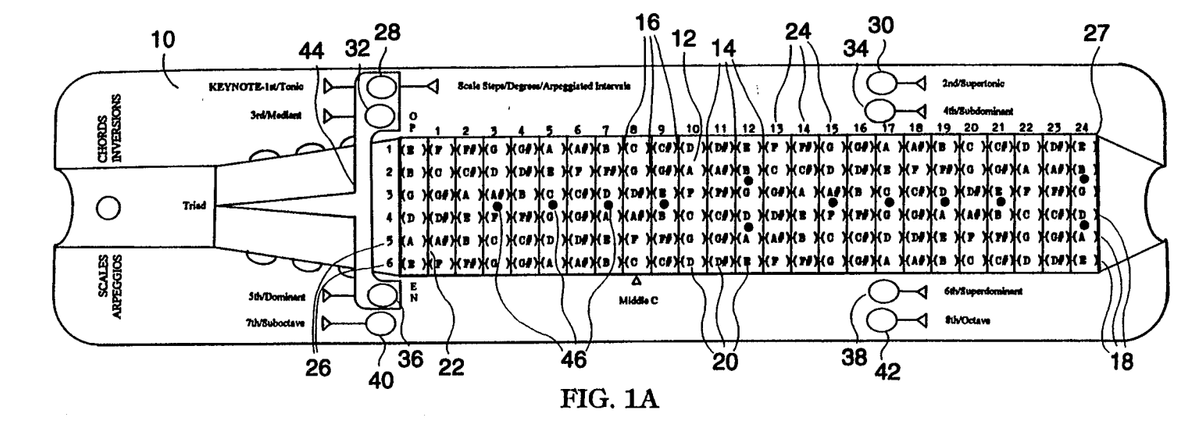
FIG. 1A is a frontal plan view showing a preferred embodiment consisting of a housing and having a transparency, a plurality of display windows, and the respective indicia thereon.

Referring to the figures, FIG. 1A is a frontal plan view showing a housing 10. Representing a preferred embodiment, housing 10 is of a slide rule nature, and is generally a hollow, envelope-shaped enclosure, open at either end and designed to function interdependently with any preselected sliding member 50, (an example of which may be seen in FIG. 2A). Possible substances used in the manufacture of housing 10 are varied; however, recycled plastics or paper products in the form of lightweight cardboard are optimal choices.

A simulated fingerboard 12, formed from a thin, flexible, nonglare transparency, is positioned within a centrally-placed, rectangularly-shaped void, or display window 27, and is attached to the underside of the front panel of housing 10 using adhesive. Conversely, a one-piece design is possible when plastics having both opaque and translucent qualities are used. Fingerboard 12 is reticulated with an imprinted series of uniformly-spaced parallel string lines 16 which extend longitudinally and represent the strings of a fretted musical instrument. These lines are regularly interrupted by an imprinted series of position alignment indicia 18 and an imprinted index of tone letters 20. A series of uniformly-spaced parallel lines printed thereon transverse the longitudinal lines and represent a nut 22 and a plurality of frets 14 of the instrument. An index of position markers 46, formed by a series of solid dots, are positioned accordingly and printed thereon to represent traditional fretted instrument position markers. A series of fret number indicators 24, consisting of a series of laterally-spaced numerical symbols, are positioned above display window 27, and printed thereon such that each component numeral falls in between each of the frets 14. A series of string number indicators 26, consisting of a series of perpendicularly-spaced numerical symbols, are printed thereon correlatively adjacent to string lines 16.

Additional voids thereon form a series of eight strategically arranged, multifunction display windows 28, 30, 32, 34, 36, 38, 40, and 42 which are positioned accordingly with indicia indicative of the degrees of a musical scale respectively printed adjacent to each void, or window. These display windows are used primarily to identify certain tonal characteristics within musical scales. Their arrangement assists in the identification of various "extended" or "dominant" chord tones which are extracted from any musical scale type containing a first, third, fifth, and seventh harmonic interval. A triad indicator 44, formed by an imprinted series of both straight and curved interconnecting lines, serves to isolate display windows 28, 32, and 36. This indicator is used to identify various "triadic" chord tones which are extracted from any musical scale type containing a first, third, and fifth harmonic interval.

Figure 1B:
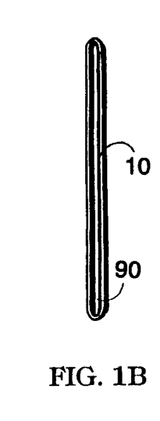
FIG. 1B is a plan view of one end of the embodiment shown in FIG. 1A.

FIG. 1B is a plan view showing one end of housing 10 and exposing an aperture 90. Aperture 90 represents that portion of housing 10 which facilitates the use of any preselected sliding member 50 by providing generally a hollow, slit-shaped passageway.

FIGS. 2A, 2B, 2C, and 2D are plan views showing a plurality of typical disembodied displaceable medial slides, or sliding members 50, adapted for use with housing 10 in demonstrating examples of the following musical scale types: heptatonic, foreign, exotic, and pentatonic, respectively. Further, these figures represent a method of construction for any sliding member 50 used in the demonstration of musical scales. Possible substances used in the manufacture of any sliding member 50 are varied, with recycled plastic or cardboard being preferred.

Figure 2A:
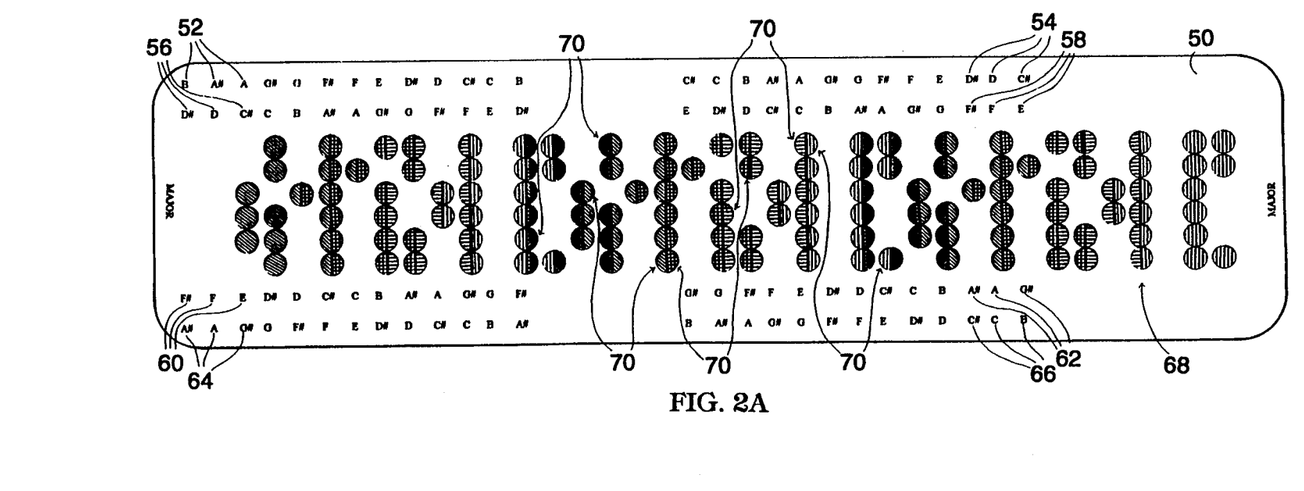
FIG. 2A is a plan view showing one side of a typical disembodied sliding member having the respective indicia for use in demonstrating an heptatonic musical scale type.
Figure 2B:
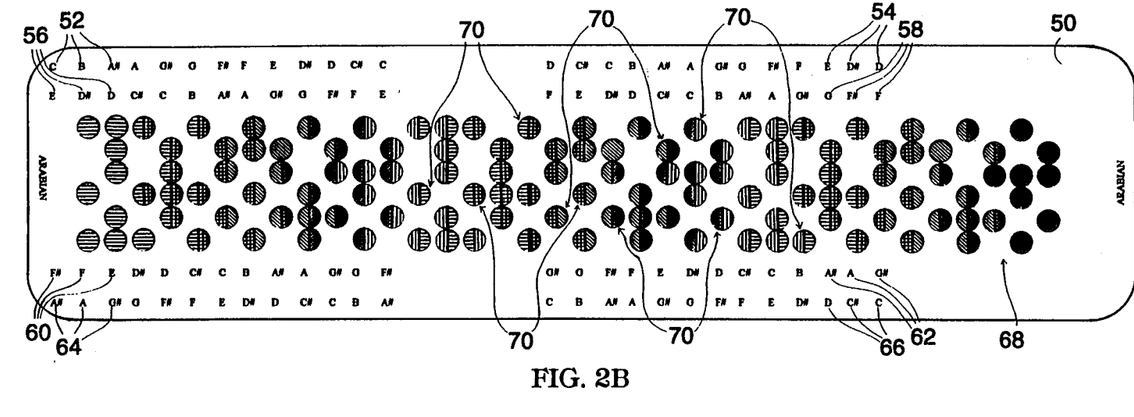
FIG. 2B is a plan view showing one side of a typical disembodied sliding member having the respective indicia for use in demonstrating a foreign musical scale type.
Figure 2C:
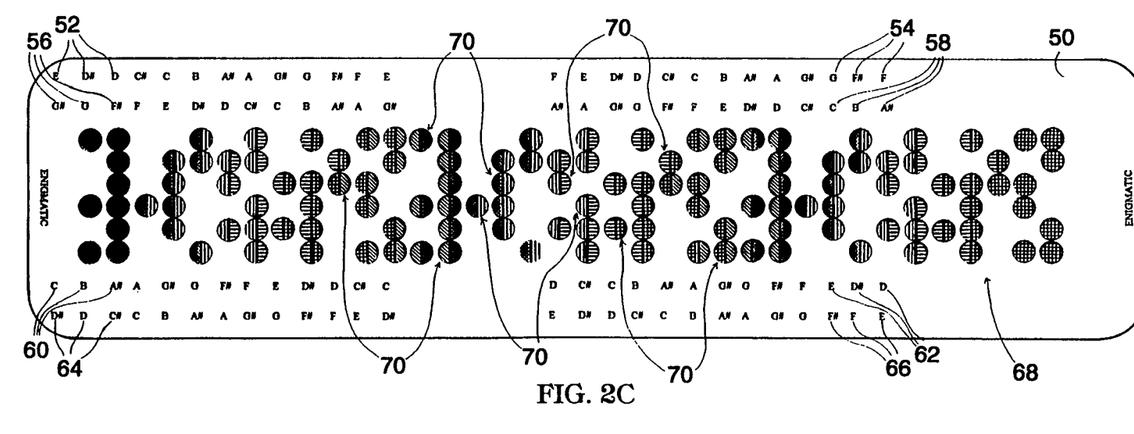
FIG. 2C is a plan view showing one side of a typical disembodied sliding member having the respective indicia for use in demonstrating an exotic musical scale type.
Figure 2D:
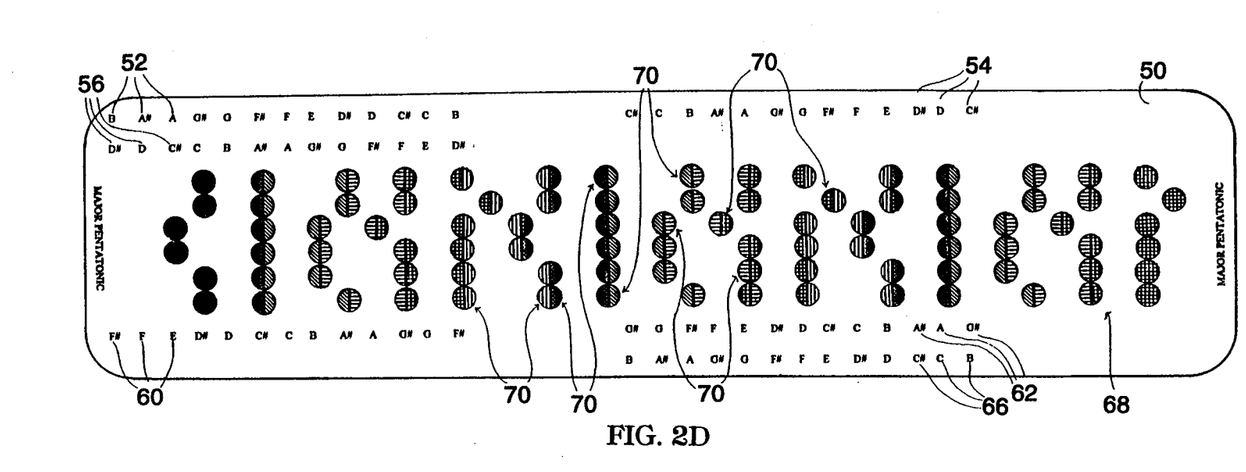
FIG. 2D is a plan view showing one side of a typical disembodied sliding member having the respective indicia for use in demonstrating a pentatonic musical scale type.

Each sliding member 50 used in demonstrating musical scales is imprinted with a system of tone indicators 52, 54, 56, 58, 60, 62, 64, and 66, which individually consist of a series of laterally-spaced letter delineations for musical tones, each in a predetermined chromatic succession. These indicators are used to identify tonality for correspondence to scale steps/degrees, or when demonstrating chords for correspondence to arpeggiated intervals. In FIG. 2D, tone indicators 58 and 64 are omitted since a pentatonic, or five-tone scale is illustrated.

An index of finger position indicia 68, printed thereon in a predetermined collateral manner to tone indicators 52–66, forms an aggregate of color-coded dots. This aggregate represents a primary coding system which serves to isolate a series of caged scale patterns 70, each of which is assigned its own color. (Color distinction is represented in drawing figures using patterned fill.) A predetermined number of dots are characteristically divided into two colors to indicate single fingering positions contained in two opposed scale patterns 70. Colors may be sequenced arbitrarily, with a consideration being placed on contrast only.

Figure 3:
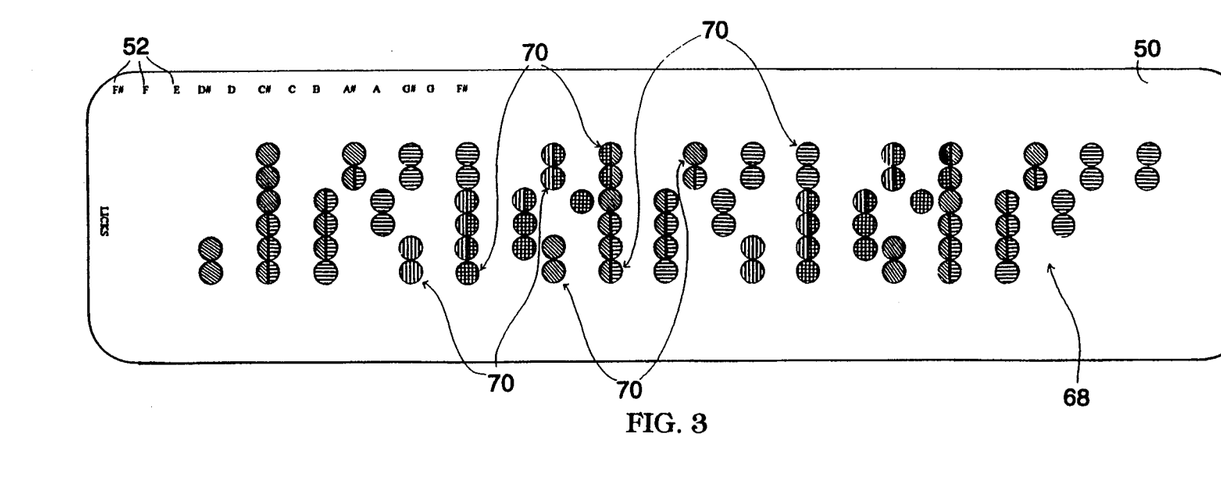
FIG. 3 is a plan view showing one side of a typical disembodied sliding member having the respective indicia for use in demonstrating a plurality of licks.

FIG. 3 is a plan view showing a typical disembodied sliding member 50 used in demonstrating a plurality of licks. Further, this figure represents a method of construction for any sliding member 50 used in the demonstration of licks.

Tone indicators 52, which consist of a series of laterally-spaced letter delineations for musical tones, are printed thereon in a predetermined chromatic succession. These indicators are used to identify tonality.

Finger position indicia 68, which form an aggregate of color-coded dots, are arranged and printed thereon in a predetermined manner. This initial coding system serves to isolate a series of scale patterns 70, each of which is assigned its own color. (Color distinction is represented in drawing figures using patterned fill.) Dots divided into two colors indicate single fingering positions which are contained in two opposed scale patterns 70. Colors may be sequenced arbitrarily with a consideration being placed on contrast only.

Figure 4:
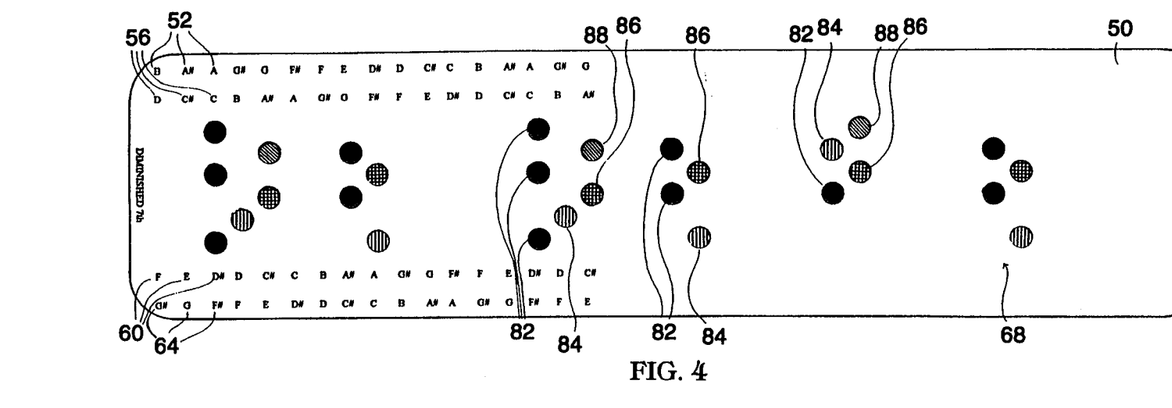
FIG. 4 is a plan view showing one side of a typical disembodied sliding member having the respective indicia for use in demonstrating a plurality of chords in various voicings.

FIG. 4 is a plan view showing a typical disembodied sliding member 50 used in demonstrating a plurality of chords in various voicings, in this case, diminished 7th chords. Further, this figure represents a method of construction for any sliding member 50 used in the demonstration of chords.

Tone indicators 52, 56, 60, and 64, which in this case individually consist of an extended series of laterally-spaced letter delineations for musical tones, are printed thereon, each in a predetermined chromatic succession. These indicators are used to identify tonality for correspondence to arpeggiated intervals and are extended in series when demonstrating chords to enable an expanded range of certain chord voicings.

For chord formations, finger position indicia 68 consist of a series of finger placement indicators 82, 84, 86, and 88, which are also arranged and printed thereon in a predetermined manner. These indicators represent a secondary coding system which is color-specific to each individual finger placement for chord formations with respect to a fretted musical instrument. (Color distinction is represented in drawing figures using patterned fill.)

Figure 5:
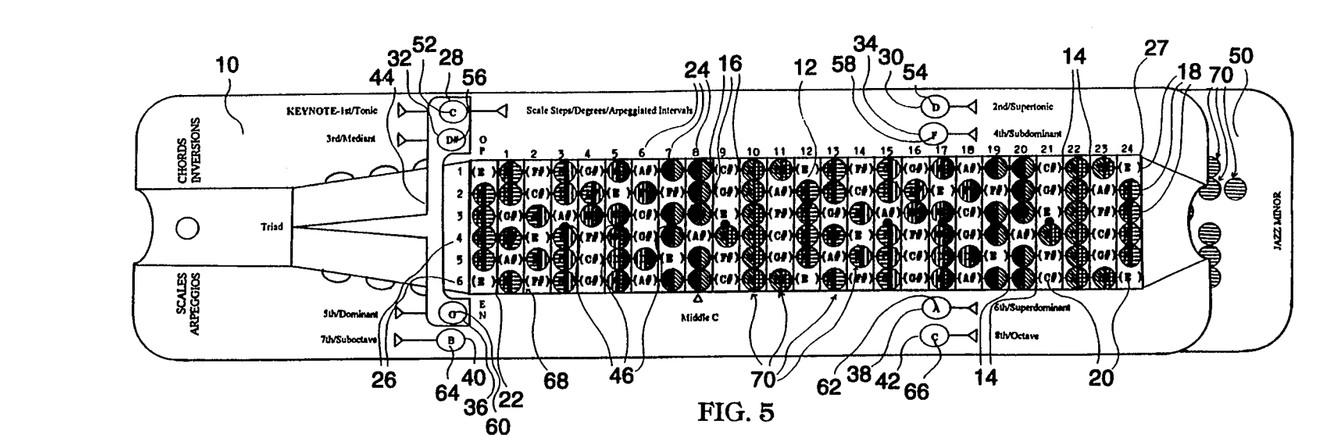
FIG. 5 is a frontal plan view showing a preferred embodiment of the present invention, consisting of the housing with a typical sliding member shown inserted into an aperture and resting at a shifted position.

FIG. 5 is a frontal plan view showing a preferred embodiment of the present invention consisting of housing 10 with a typical sliding member 50 shown inserted into aperture 90 (shown in FIG. 1B) and resting at a shifted position. Simulated fingerboard 12 is reticulated with an imprinted series of uniformly-spaced parallel string lines 16 which extend longitudinally and represent the strings of a fretted musical instrument. These lines are regularly interrupted by printed position alignment indicia 18 and printed tone letters 20. A series of uniformly-spaced printed parallel lines transverse the longitudinal lines and represent the nut 22 and frets 14 of the instrument. Position markers 46, formed from a series of solid dots, are positioned accordingly and printed thereon to represent traditional fretted instrument position markers. Fret number indicators 24, consisting of a series of laterally-spaced numerical symbols, are positioned above display window 27, and are printed thereon so that each component numeral falls in between each of the frets 14. String number indicators 26, consisting of a series of perpendicularly-spaced numerical symbols, are printed thereon correlatively adjacent to string lines 16.

A series of strategically arranged display windows 28, 30, 32, 34, 36, 38, 40, and 42 are positioned accordingly, with indicia indicative of the degrees of a musical scale respectively printed adjacent to each said window. These display windows are used primarily to identify certain tonal characteristics within musical scales and are arranged to assist in the identification of various extended and dominant chord tones. Triad indicator 44, formed by an imprinted series of both straight and curved interconnecting lines, serves to isolate display windows 28, 32, and 36. This indicator is used to identify triadic chord tones.

Sliding member 50 is imprinted with a system of tone indicators 52, 54, 56, 58, 60, 62, 64, and 66, which individually consist of a series of laterally-spaced letter delineations for musical tones in a predetermined chromatic succession. These indicators are used to identify tonality.

Finger position indicia 68, which form an aggregate of color-coded dots, are arranged in a predetermined collateral printed manner. This coding system serves to isolate a series of scale patterns 70, each of which is assigned its own color. (Color distinction is represented in drawing figures using patterned fill.) Dots which are divided into two colors indicate single fingering positions which are contained in two opposed scale patterns 70. Colors may be sequenced arbitrarily with a consideration being placed on contrast only.

Operations

While similar in operation to slide rules presently utilized, the Universal Musical Scale, Scale Pattern, and Chord Indicator is unique in its ability clearly to demonstrate elements of tonal music in their actual physical relationships to the fingerboard of a fretted musical instrument. A housing 10 (shown in FIG. 1) is used in an intended interdependence with coding systems on any preselected sliding member 50 (examples of which are shown in FIGS. 2A-4) to demonstrate specifically those elements which collectively formulate musical scales or chords. This is accomplished by first selecting a sliding member 50 and inserting it into aperture 90 of housing 10 (see FIG. 5). Discretionary alignment of finger position indicia 68 on sliding member 50 with position alignment indicia 18 on fingerboard 12 is done visually by the operator causing the contrasting color characteristic of each dot to correspond with respective tone letters 20. Simultaneously, applicable tone indicators 52–66 align for correspondence with respective display windows 28–42 while further maintaining a definite relationship with triad indicator 44. Accordingly, the operator will see that the finger position indicia 68 and the appropriate tone indicators 52–66 which are now visible through display windows 28–42 are correspondent to both one another and to the musical scale or chord being demonstrated for each tonic selected.

During operations, the color-coding system greatly simplifies the task of locating a multiplicity of ascending and descending points for fingering the various pattern voicings. In effect, a maximum of five patterns are possible for every twelve frets of fingerboard travel. A secondary color-coding system for identifying the individual finger placements for chord formations is significantly different. Using five colors, each finger of the hand used to form a chord is assigned its own color. The fifth color can be used in certain instances to indicate the fingering of a root note.

When demonstrating scales, display windows 28–42 identify the scale steps or degrees using scale degree terminology. Display window 28 identifies the keynote, or tonic; the first scale step, or degree. Tonic indicates the first tone, which in turn indicates the chief tone of the scale, or the tonic tone; the tonal center, on which the scale is constructed. Each tonic has a set of tones which are related to it in varying degrees. Display window 30 identifies the second scale step or the supertonic, the second scale degree. Supertonic implies the "tone above the tone" and is an apt description of the second scale tone. Display window 32 identifies the third scale step or the mediant, the third scale degree. Mediant refers to that degree which exists in between the tonic and dominant scale degrees, the combined characteristics of which serve to formulate various major, minor, augmented, and diminished "triads". Display window 34 identifies the fourth scale step or the subdominant, the fourth scale degree. Subdominant implies the "dominant below the dominant". Display window 36 identifies the fifth scale step or the dominant, the fifth scale degree. Dominant refers to certain functions which result in its "dominating" the other tones in the same key. Display window 38 identifies the sixth scale step or the superdominant, the sixth scale degree. Superdominant implies the "dominant above the dominant". Display window 40 identifies the seventh scale step or the suboctave, the seventh scale degree. This degree is often referred to as the "leading tone", a term which implies an impending tonal resolution. However, the term preferred here is the less common suboctave, which does not impute any special qualities on the seventh tone, but simply refers to the tone below that of the eighth interval. The characteristics of the seventh tone, when combined with those of the triadic chord tones, serve to formulate various "extended" and "dominant" chords. Display window 42 identifies the eighth scale step or the octave, the eighth scale degree. Octave refers to the eighth tone of the scale. When chords are demonstrated, display windows 28–42 identify related chord tones in arpeggiated intervals.

A chord number system is used to categorize scales and chords into their proper families of major, minor, and dominant. From any arbitrarily chosen tone, subsequent progressions of semi-tones result in the following number assignments:

| Chromatic (semi-tones) | 1 | 2  | 3  | 4  | 5  | 6  | 7   | 8  | 9   | 10 | 11  | 12 |
|---|---|---|---|---|---|---|---|---|---|---|---|---|
| Harmonic intervals     | 1 | b2 | 2  | b3 | 3  | 4  | b5  | 5  | #5  | 6  | b7  | 7  |
| Chromatic (semi-tones) | 1 | 2  | 3  | 4  | 5  | 6  | 7   | 8  | 9   | 10 | 11  | 12 |
| Harmonic intervals     | 8 | b9 | 9  | #9 | 10 | 11 | #11 | 12 | b13 | 13 | #13 | 14 |

Separation is determined by the characteristics of the third and seventh intervals. Major scales and extended major chords contain the major third and major seventh intervals; minor scales and extended minor chords contain the minor third and minor seventh intervals, and dominant scales and chords contain the major third and minor seventh intervals. Augmented and diminished scales and chords are considered to be of the dominant family, and are characterized by an augmented fifth or a minor third and a diminished fifth, respectively.

Conclusion, Ramifications, and Scope

Much of today's popular music incorporates elements of traditional music from other countries, as is evident in such forms as "world music", and "world beat". The increasing accessibility of these forms is due in part to a growing cultural awareness encouraged by the mass media and other agencies. The present invention described in my application reflects this awareness, by demonstrating a wide variety of foreign and exotic scales with much information within them for the serious music student. In addition, this device can be used to demonstrate all commonly used scales and scale inversions as well as a wide variety of chords, extended chords, licks, and arpeggios.

FIGS. 2A–2D depict various displaceable medial slides used in demonstrating a plurality of musical scale types. These figures, which further represent a method of construction for any medial slides used in the demonstration of musical scales, may be used to realize the following examples:

| | |
|---|---|
| Ionian (Major) CDEFGAB | Dorian DEFGABC |
| Phrygian EFGABCD | Lydian FGABCDE |
| Mixolydian GABCDEF | Aeolian ABCDEFG |
| Locrian BCDEFGA | Whole Tone CDEF#G#A# |
| Whole Step Half Step | Half Step Whole Step |
| Diminished CDD#FF#G#AB | Diminished CC#D#EF#GAA# |
| Augmented CD#EGG#B | Major Pentatonic CDEGA |
| Pentatonic Mode 2 DEGAC | Pentatonic Mode 3 EGACD |
| Pentatonic Mode 4 GACDE | Blue Pentatonic (Minor) ACDEG |
| Harmonic Minor CDD#FGG#B | Harmonic Min. Mode 2 DD#FGG#BC |
| Harmonic Min. Mode 3 D#FGG#BCD | Harmonic Min. Mode 4 FGG#BCDD# |
| Harmonic Min. Mode 5 GG#BCDD#F | Harmonic Min. Mode 6 G#BCDD#FG |
| Harmonic Min. Mode 7 BCDD#FGG# | Melodic or Jazz Minor CDD#FGAB |
| Lydian Augmented CDEF#G#AB | Lydian b7 CDEF#GAA# |
| Locrian #2 CDD#FF#G#A# | Super Locrian CC#D#EF#G#A# |
| Bop CDEFGAA#B | Blues CD#FF#GA# |
| Double Harmonic CC#EFGG#B | Enigmatic CC#EF#G#A#B |
| Major Phrygian CC#EFGG#A# | Major Locrian CDEFF#G#A# |
| Lydian Minor CDEF#GG#A# | Overtone CDEF#GAA# |
| Leading Whole Tone CDEF#G#A#B | Neapolitan Major CC#D#FGAB |
| Neapolitan Minor CC#D#FGG#B | Oriental CC#EFF#AA# |
| Hirajoshi CDD#GG# | Hungarian Major CD#EF#GAA# |
| Hungarian Minor CDD#F#GG#B | Kumoi CC#FGG# |
| Iwato CC#FF#A# | Hindu CDEFGG#A# |
| Spanish CC#EFGG#A# | Spanish 8 Tone CC#D#EFF#G#A# |
| Pelog CC#D#GA# | Gypsy CC#EFGG#B |
| Hungarian Gypsy CDD#F#GG#A# | Arabian CDEFF#G#A# |
| Balinese CC#D#GG# | Mohammedan CDD#FGG#B |
| Javanese CC#D#FGAA# | Byzantine CC#EFGG#B |
| Jewish CC#EFGG#A# | Mongolian CDEGA |
| Egyptian CDFGA# | Japanese CC#FGG# |
| Thai (sun) Sootsanaen GACDE | Thai (yao) Yai ACDEG |

Each scale type can be interpreted harmonically, as well as enharmonically as several Different scales, with each interpretation having a multiplicity of pattern voicings.

Furthermore, the device has additional advantages in that:
- its total capacity for demonstrations, which includes scales, scale patterns, chords, licks, and arpeggios in various voicings for all twelve tones of the chromatic scale is presently estimated at over 10,000 computations;
- its indications of licks, which are based on scale tones, are very popular among rock, country, jazz, and blues musicians;
- its didactic fingerboard design, which makes use of small details such as position markers and a simulated tuning mechanism, so convincingly resembles the fingerboard of an actual guitar as to make it extremely user-friendly;
- its compact size and weight facilitate use and storage;
- its materials of manufacture, such as recycled plastic or paper products result in a product which is not only cost effective, but is also environmentally friendly.

Although the descriptions above contain a number of specifics, these should not be construed as limiting the scope of the invention, but rather as merely providing some illustrations on the presently preferred embodiments of this invention. For example, the indicator can use alternate indicating means, such as microcircuitry with LED readout, in place of the multiple sliding members; however, this would be more costly to manufacture and would preclude the possibility of a significant marketing advantage. Also, the indicator can function easily in varying shapes and forms. For example, the indicator can be alternately designed to facilitate its use with varieties of fretted instruments such as bass guitars, banjos, mandolins, ukuleles, lutes, balalaikas, and so on. Thus, the scope of this invention should be determined by the appended claims and their legal equivalents, rather than by the examples given.

I claim:

1. A universal musical scale, scale pattern, and chord indicator for use in teaching a preselected musical scale and for simplifying the task of locating a multiplicity of ascending and descending points for learning finger positioning of the scale as it relates in a series of pattern voicings to a fingerboard of a fretted musical instrument, comprising:

(a) an improved slide rule type device including a housing having an aperture and a series of at least eight display windows thereon, at least seven said display windows of which further having indicia indicative of a scale degree respectively printed correlatively adjacent thereto, and further including a transparency positioned within one of said display windows, said transparency having indicia printed thereon to simulate said fingerboard, and further having an imprinted series of position alignment indicia and an imprinted index of tone letters, (b) a displaceable medial sliding member having an aggregate of color coded dots thereon, said aggregate including an imprinted index of finger position indicia wherein a number of said dots are characteristically divided into two contrasting colors and are arranged and printed on said member in a predetermined manner by which insertion of said member into said aperture of said housing and through which discretionary alignment causes the two contracting colors of each of said dots to correspond with respective said tone letters of said transparency whereby indicating single fingering positions contained within two opposed said pattern voicings and further enabling simultaneous correspondence to said multiplicity by way of said aggregate, and (c) an imprinted series of both straight and curved interconnecting lines located on said housing which serves to isolate at least three of said display windows, and said member further having an imprinted system of at least four tone indicators thereon which individually consist of a series of laterally spaced letter delineations for musical tones, each of which is arranged and printed in a predetermined manner by which said insertion of said member into said aperture of said housing and through which said discretionary alignment further causes correspondence of each of said tone indicators respectively with at least one of said display windows, said tone indicators thereby maintaining a definite relationship with said imprinted series whereby effecting simultaneous indications in reference to tonality.

* * * * *